United States Patent [19]
Bannai et al.

[11] Patent Number: 5,149,273
[45] Date of Patent: Sep. 22, 1992

[54] CLOCK SPRING

[75] Inventors: Hiroyuki Bannai, Furukawa; Hironori Kato, Sendai, both of Japan

[73] Assignee: Alps Electric Co., Ltd., Tokyo, Japan

[21] Appl. No.: 715,079

[22] Filed: Jun. 13, 1991

[30] Foreign Application Priority Data

Jun. 14, 1990 [JP] Japan .............................. 2-62196[U]

[51] Int. Cl.$^5$ ............................................. H01R 39/02
[52] U.S. Cl. ........................................ 439/15; 439/164
[58] Field of Search .................................. 439/15, 164

[56] References Cited
U.S. PATENT DOCUMENTS

| | | |
|---|---|---|
| 3,763,455 | 10/1973 | Confer et al. |
| 4,721,469 | 1/1988 | Carlson |
| 4,824,396 | 4/1989 | Sasaki et al. ..................... 439/164 X |
| 4,930,716 | 6/1990 | Bannai |
| 4,975,063 | 12/1990 | Ida et al. ................................ 439/15 |

Primary Examiner—Eugene F. Desmond
Attorney, Agent, or Firm—Guy W. Shoup; B. Noel Kivlin

[57] ABSTRACT

A clock spring for use with a steering device of an automobile, including a fixed member, a movable member rotatably mounted on the fixed member with a cable accommodating portion defined therebetween, and a cable accommodated in the cable accommodating portion for effecting electrical connection between the fixed member and the movable member. One end of the cable is fixed to the fixed member and led out of the fixed member, while the other end of the cable is fixed to the movable member and led out of the movable member. One portion of the cable is wrapped in one direction on either of the fixed member or the movable member, while the other portion is wrapped in the opposite direction reverse to the one direction on the other of the fixed member and the movable member, whereby an inverted portion of the cable is formed between the one portion and the other portion. The improvement of the clock spring resides in the point that the number of wrapping of one or several of plural cable elements constituting the cable is set to be smaller than that of the remaining cable elements.

2 Claims, 13 Drawing Sheets

CLOCK SPRING

BACKGROUND OF THE INVENTION

1. Field of the Invention

The present invention relates to a clock spring for use with a steering device of an automobile, for example, including a fixed member, a movable member, and a cable for effecting electrical connection between the fixed member and the movable member.

2. Description of Related Art

A clock spring is generally constructed of a fixed member, a movable member rotatably mounted on the fixed member, a flexible cable connecting the fixed member and the movable member. Such a clock spring is used as an electrical connecting device for effecting electrical connection between the fixed member and the movable member adapted to be rotated with a finite number of revolutions as in a steering device of an automobile.

In a known clock spring of this kind, a cable accommodating portion is defined between the fixed member and the movable member, and a flat cable formed by laminating a pair of strip films with a plurality of conductors sandwiched therebetween is loosely accommodated in the cable accommodating portion under a spirally wrapped condition. One end of the flat cable is fixed to an outer cylindrical portion formed on either the fixed member or the movable member, while the other end of the flat cable is fixed to an inner cylindrical portion formed on the other of the fixed member and the movable member.

When the movable member of the clock spring is rotated, the flat cable accommodated in the cable accommodating portion can be wrapped onto the inner cylindrical portion from the outer cylindrical portion or unwrapped from the inner cylindrical portion to the outer cylindrical portion according to a rotational direction of the movable member. Accordingly, while the flat cable is being unwrapped from the inner cylindrical portion to the outer cylindrical portion, almost no tension is applied to the flat cable, and electrical connection between the fixed member and the movable member rotating relative thereto can be maintained at all times.

In the above-mentioned conventional clock spring, it is known that a positioning mechanism is provided between the fixed member and the movable member, which mechanism has a position indicating portion changing with a rotational amount of the movable member. This positioning mechanism is visually observed from the outside of the clock spring by an operator, so that a wrapped condition of the flat cable accommodated in the cable accommodating portion defined between the fixed member and the movable member can be confirmed by the operator. However, although such a positioning mechanism is provided, it is difficult to completely eliminate a problem that the clock spring is erroneously mounted in a steering device or the like under the condition where the movable member is rotationally offset in either a clockwise or counterclockwise direction from a neutral position.

It is assumed that the clock spring is erroneously mounted under the condition where a rotatable amount of the movable member in a wrapping direction of the flat cable is smaller than a predetermined amount. In this case, when the movable member is rotated in the wrapping direction of the flat cable by an amount larger than the predetermined amount, a tension is applied to the flat cable to thereby forcibly cut the flat cable. The cutting of the flat cable is electrically detected to find the erroneous mounting of the clock spring. However, the flat cable is very hard to cut as is well known, and it is accordingly necessary to provide a cutter or the like for cutting the flat cable in the clock spring, thus complicating the internal construction of the clock spring.

In contrast, it is assumed that the clock spring is erroneously mounted under the condition where a rotatable amount of the movable member in an unwrapping direction of the flat cable is smaller than the predetermined amount. In this case, when the movable member is rotated in the unwrapping direction of the flat cable by an amount larger than the predetermined amount, the flat cable is inverted in the vicinity of an inner circumferential end thereof. Thus, excess rotation of the movable member is not hindered. It is therefore impossible to forcibly cut the flat cable so as to detect the erroneous mounting of the clock spring.

SUMMARY OF THE INVENTION

It is accordingly an object of the present invention to provide a reliable clock spring which can simply and reliably cut one or several cables so as to detect the erroneous mounting of the clock spring.

It is another object of the present invention to provide an inexpensive clock spring which can greatly reduce a necessary length of the cable.

According to one aspect of the present invention, there is provided in a clock spring including a fixed member, a movable member rotatably mounted on said fixed member with a cable accommodating portion defined therebetween, and a cable accommodated in said cable accommodating portion, said cable having one end fixed to said fixed member and led out of said fixed member and having the other end fixed to said movable member and led out of said movable member; the improvement wherein said cable accommodating portion comprises a plurality of first concentric grooves and second concentric grooves arranged in opposed relationship to each other, and said cable comprises a plurality of wire-like cables separated from one another, one portion of said wire-like cables being wrapped in one direction within either of said first concentric grooves or said second concentric grooves, while the other portion being wrapped in the opposite direction reverse to said one direction within the other of said first concentric grooves and said second concentric grooves, whereby an inverted portion of each said wire-like cable is formed between said one portion and said other portion, the number of wrapping of one or several of said wire-like cables being smaller than that of the remaining wire-like cables.

According to another aspect of the present invention, there is provided in a clock spring including a fixed member, a movable member rotatably mounted on said fixed member with a cable accommodating portion defined therebetween, and a cable accommodated in said cable accommodating portion, said cable having one end fixed to said fixed member and led out of said fixed member and having the other end fixed to said movable member and led out of said movable member; the improvement wherein one of said fixed member and said movable member is provided with an inner cylindrical portion, and the other of said fixed member and said movable member is provided with an outer cylindrical portion, one portion of said cable being wrapped in one direction on an outer surface of said inner cylindrical portion, while the other portion being wrapped in the opposite direction reverse to said one direction on an inner surface of said outer cylindrical portion, whereby an inverted portion of said cable is formed between said one portion and said other portion, said cable comprising a plurality of cable elements extending in parallel to one another, at least one of said inner cylindrical portion and said outer cylindrical portion being provided with a plurality of cable leading portions for leading out one or several of said cable elements and leading out the remaining cable elements, said cable leading portions being positioned circumferentially apart from one another.

In the case that the clock spring is properly mounted in equipment such as a steering device under the condition where relative positioning between the movable member and the fixed member is properly effected, when the movable member interlocking with a steering wheel or the like is rotated relative to the fixed member in either a clockwise or counterclockwise direction, the inverted portion of the cable is moved by an amount smaller than a rotational amount of the movable member, and the cable is unwrapped from either the movable member or the fixed member by a length equal to the moving amount of the inverted portion.

On the other hand, in the case that the clock spring is erroneously mounted under the condition where relative positioning between the movable member and the fixed member is improperly effected, when the movable member is excessively rotated, a tension is applied to one or several cables to forcibly cut the one or several cables. Accordingly, the erroneous mounting of the clock spring can be electrically detected.

Other objects and features of the invention will be more fully understood from the following detailed description and appended claims when taken with the accompanying drawings.

DETAILED DESCRIPTION OF THE PREFERRED EMBODIMENTS

Figure 1:
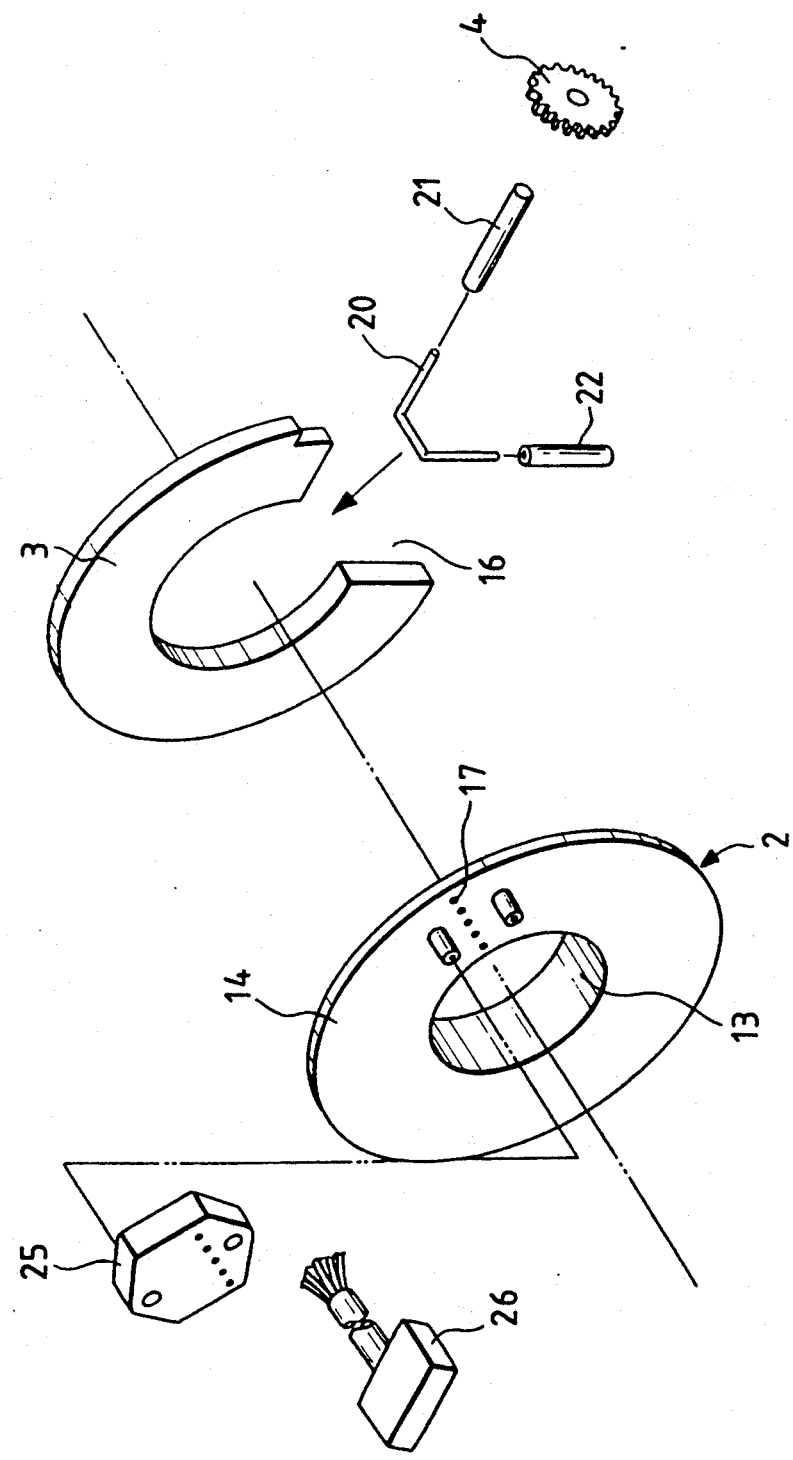
FIGS. 1 and 2 are exploded perspective views of the clock spring according to a first preferred embodiment of the present invention.
Figure 2:
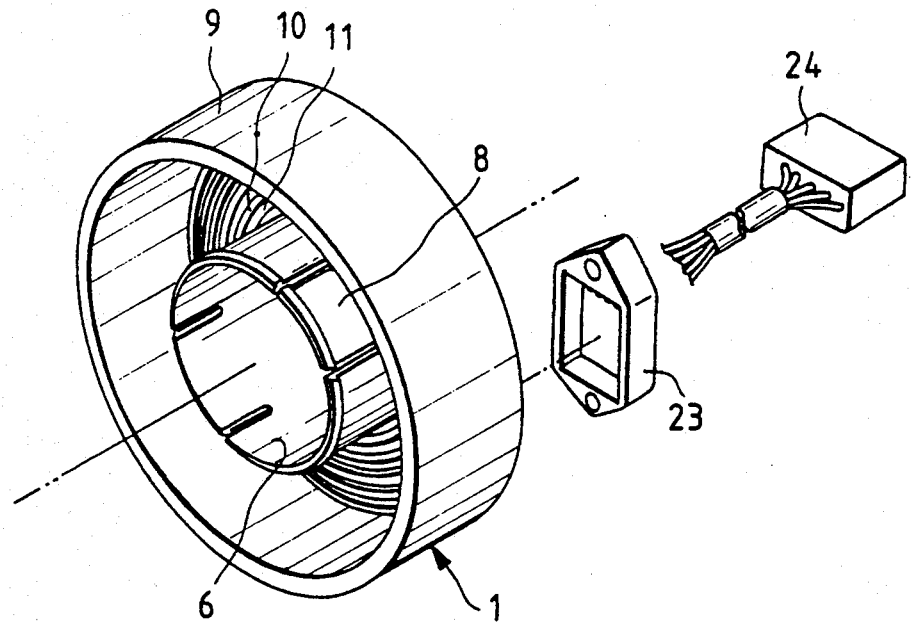
Figure 3:
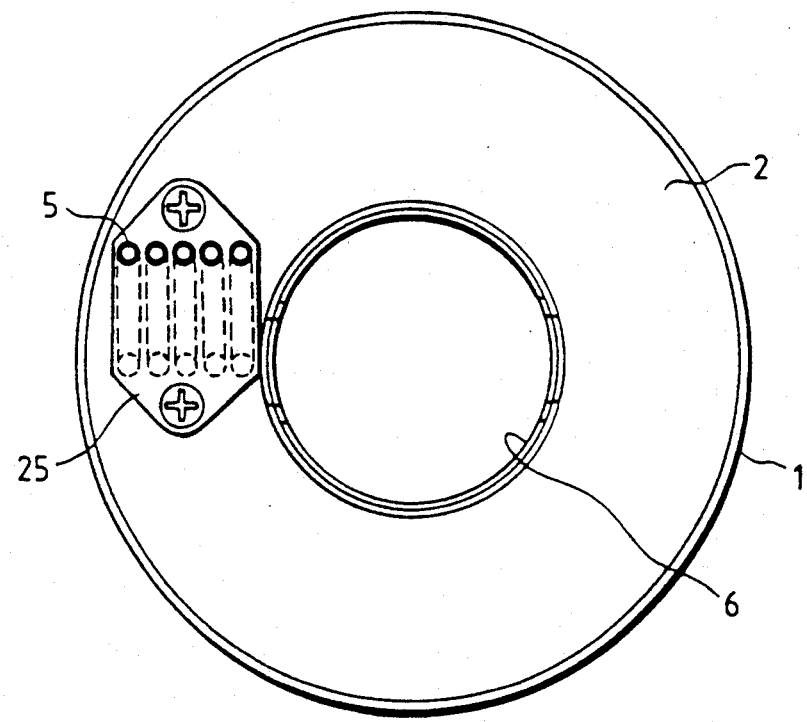
FIG. 3 is a top plan view of the clock spring shown in FIGS. 1 and 2.

A first preferred embodiment of the present invention will be described with reference to FIGS. 1 to 7.

Referring to FIGS. 1 to 4, a clock spring according to the first preferred embodiment is generally constructed of a lower case 1, an upper case 2 rotatably retained with respect to the lower case 1, a spacer 3 rotatably interposed between the lower case 1 and the upper case 2, a gear 4 for rotationally driving the spacer 3, and a plurality of wire-like flexible cables 5 accommodated in a wrapped condition between the lower case 1 and the upper case 2.

The lower case 1 is comprised of an annular bottom wall 7 having a central opening 6, a cylindrical inner side wall 8 rising from an inner circumference of the bottom wall 7, and a cylindrical outer side wall 9 rising from an outer circumference of the bottom wall 7. Thus, the lower case 1 has a generally annular, cylindrical shape with a bottom. The bottom wall 7 is formed with a plurality of cylindrical partition walls 10 projecting upwardly and arranged in a concentric relationship with one another with respect to the central opening 6, so that a plurality of (five in this preferred embodiment) first cable accommodating grooves 11 defined in a concentric relationship with one another by the cylindrical partition walls 10 and the cylindrical inner side wall 8. Each of the first cable accommodating grooves 11 is formed at its bottom with a cable leading hole (not shown). Further, an outer circumferential portion of the bottom wall 7 formed between the outermost cylindrical partition wall 10 and the cylindrical outer side wall 9 is formed with a first annular rack 12 meshing with the gear 4.

Figure 4:
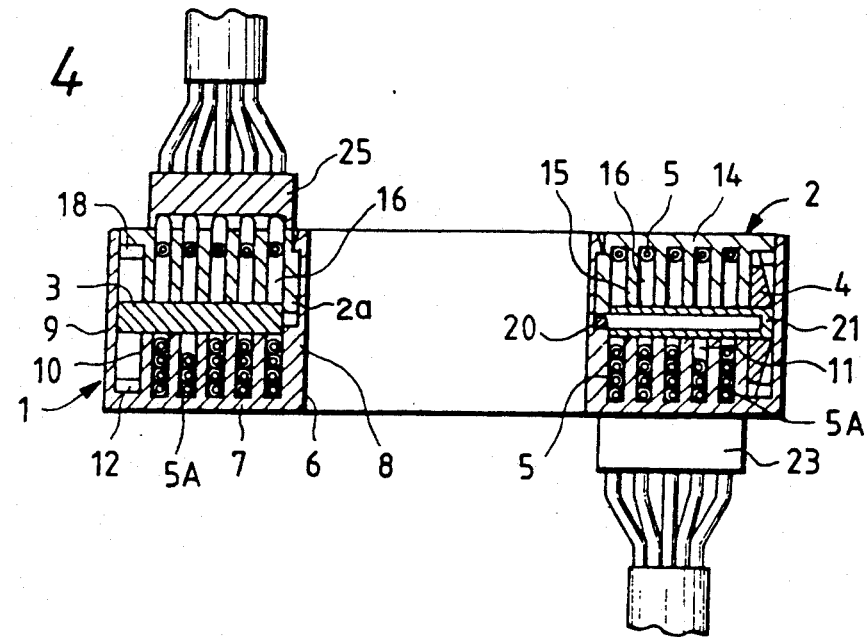
FIG. 4 is a vertical sectional view of FIG. 3.
Figure 5:
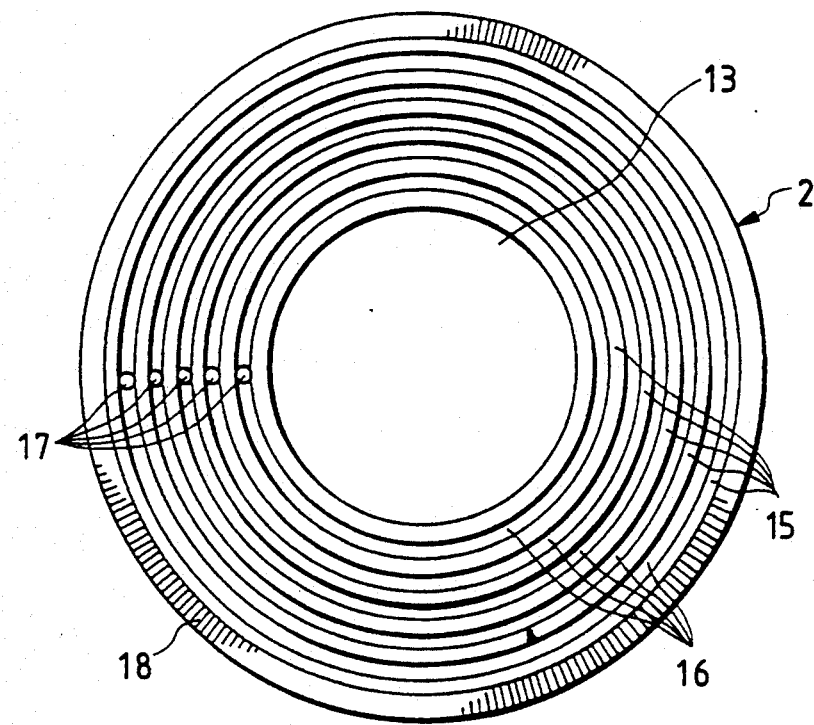
FIG. 5 is a bottom plan view of an upper case shown in FIG. 1.

As shown in FIGS. 1, 4 and 5, the upper case 2 is comprised of an annular top wall 14 having a central opening 13, and a cylindrical inner side wall 2a dependent upon an inner circumference of the top wall 14. The cylindrical inner side wall 2a of the upper case 2 is fitted with the inside of the cylindrical inner side wall 8 of the lower case 1 in a snap fashion, so that the upper case 2 is rotatably connected to the lower case 1. The top wall 14 is formed with a plurality of cylindrical partition walls 15 projecting downward and arranged in a concentric relationship with one another with respect to the central opening 13, so that a plurality of (five in this preferred embodiment) second cable accommodating grooves 16 defined in a concentric relationship with one another by the cylindrical partition walls 15 and the cylindrical inner side wall 2a. The second cable accommodating grooves 16 are opposed through the spacer 3 to the first cable accommodating grooves 11. Each of the second cable accommodating grooves 16 is formed at its top with a cable leading hole 17 (see FIG. 1). Further, an outer circumferential portion of the top wall 14 is formed with a second annular rack 18 meshing with the gear 4.

Figure 6:
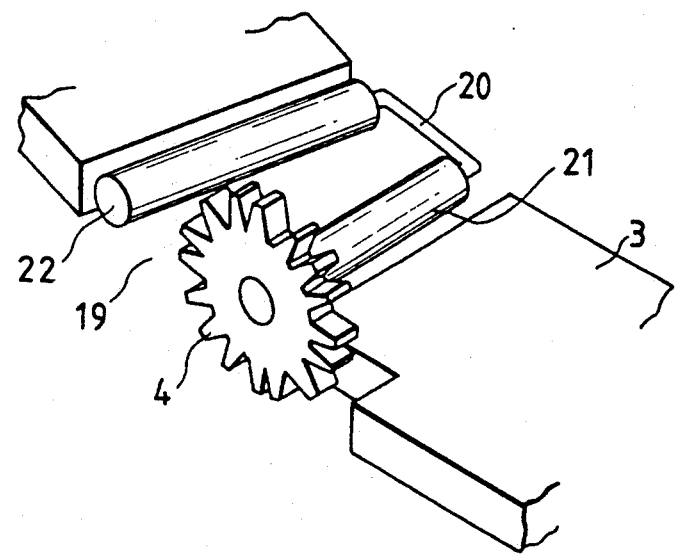
FIG. 6 is a perspective view illustrating a supporting structure of a gear shown in FIG. 1.

The spacer 3 is formed of a smooth material such as synthetic resin molding, and it has a generally annular, disk-shaped configuration with a portion thereof removed to form a cutout 19 (see FIGS. 1 and 6). As shown in FIG. 4, the spacer 3 is rotatably positioned between upper ends of the cylindrical partition walls 10 of the lower case 1 and lower ends of the cylindrical partition walls 15 of the upper case 2. As shown in FIGS. 1 and 6, substantially U-shaped shaft member 20 having two arms is received within the cutout 19, and a first roller 21 and a second roller 22 are rotatably mounted on the two arms 20a and 20b of the shaft member 20, respectively. The gear 4 is press-fitted with one end of the first roller 21. As previously mentioned, the gear 4 is in mesh with both the first annular rack 12 and the second annular rack 18.

Each flexible cable 5 is a so-called round cable constructed of a conductor wire and an insulator covering the conductor wire. In this preferred embodiment, five round cables each having such a construction are employed as the flexible cables 5. As shown in FIG. 4, one portion of each flexible cable 5 is accommodated in each first cable accommodating groove 11 of the lower case 1 with a plurality of revolutions in a stacked condition, and the other portion is accommodated in each second cable accommodating groove 16 of the upper case 2 opposed to the corresponding first cable accommodating groove 11 with a plurality of revolutions in a stacked condition. An inner end of the one portion of each flexible cable 5 accommodated in each first groove 11 passes through the cutout 19 of the spacer 3, and is almost semicircularly inverted about the second roller 22 to form an inverted portion 5a continuing to an inner end of the other portion of the flexible cable 5 in the corresponding second groove 16, while an outer end of the one portion of each flexible cable 5 accommodated in each groove 11 is led out of the lower case 1 through the corresponding cable leading hole (not shown). The flexible cables 5 led outside the lower case 1 are bent like a crank and fixed together in a holder 23 attached to a lower surface of the bottom wall 7 of the lower case 1, and are then bundled to be connected to a lower connector 24. On the other hand, an outer end of the other portion of the flexible cable 5 accommodated in each second groove 16 is led out of the upper case 2 through the corresponding cable leading hole 17. The flexible cables 5 led outside the upper case 2 are bent like a crank and fixed together in a holder 25 attached to an upper surface of the top wall 14 of the upper case 2, and are then bundled to be connected to an upper connector 26. As apparent from FIG. 4, the number of wrappings of the flexible cables 5 are not all identical with one another. In this preferred embodiment, the number of wrappings of the flexible cable 5 wrapped in the grooves 11 and 16 just inside the outermost grooves 11 and 16 (which flexible cable is denoted by reference numeral 5A for the convenience of explanation) is set to be smaller than the number of wrappings of each of the remaining flexible grooves 5. In other words, the remaining flexible cables 5 are wrapped a few more predetermined revolutions than the flexible cable 5A.

Figure 7A:
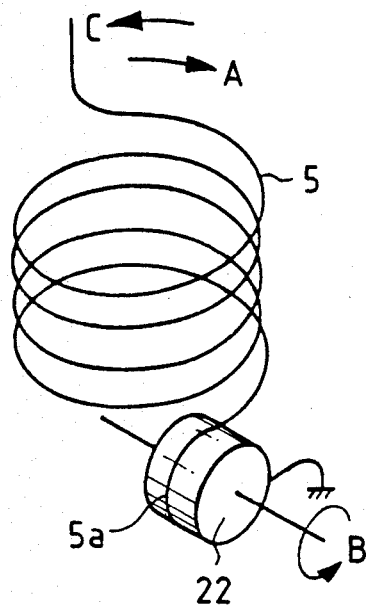
FIGS. 7A, 7B and 7C are schematic illustrations of the operation of the clock spring.
Figure 7B:
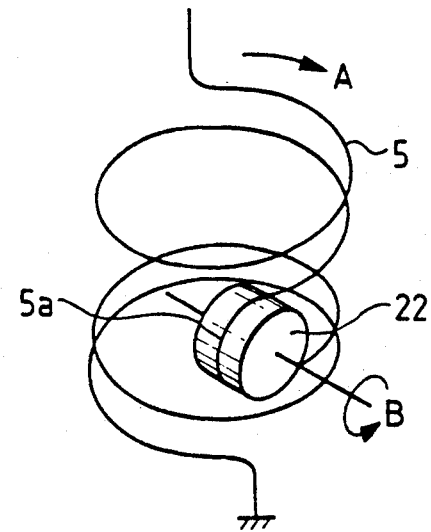
Figure 7C:
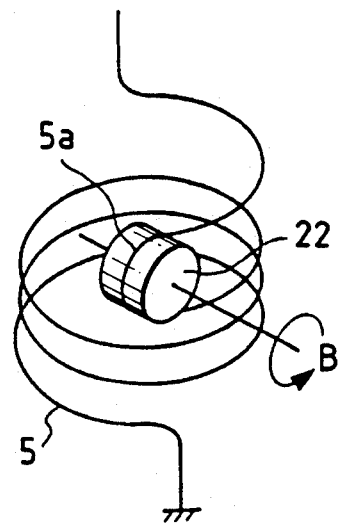
Figure 8:
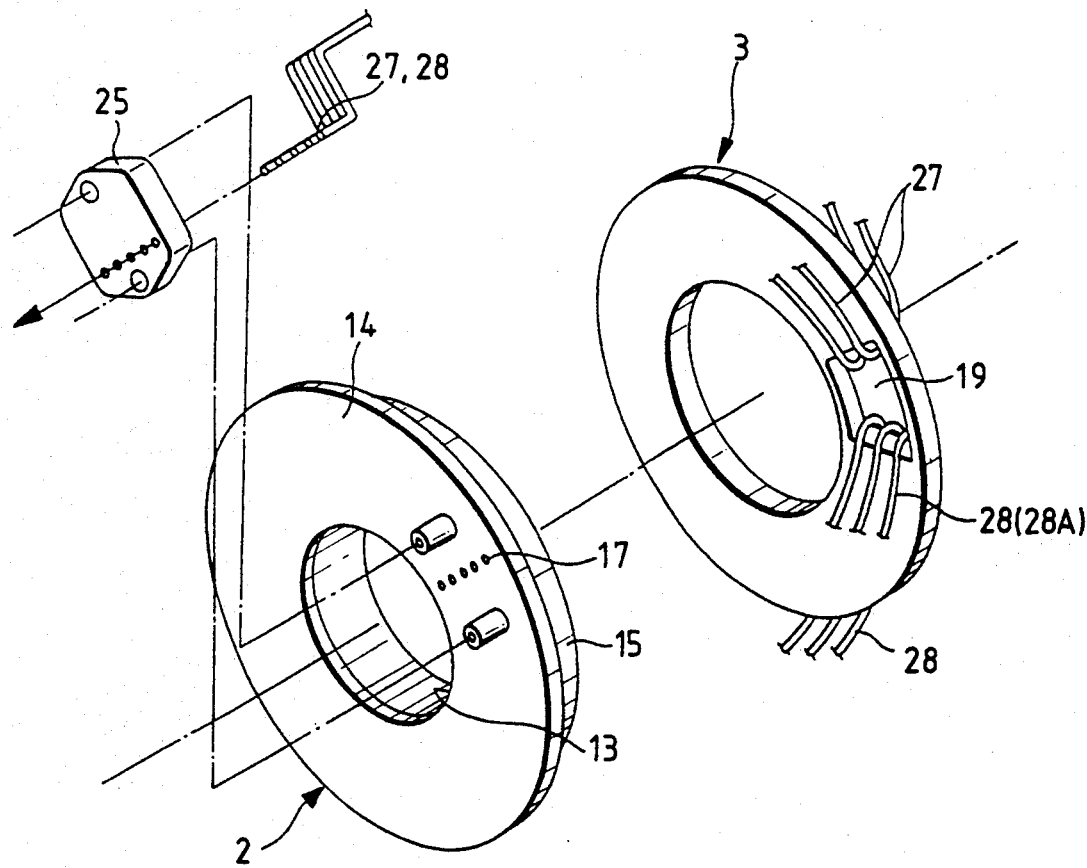
FIGS. 8 and 9 are exploded perspective views of the clock spring according to a second preferred embodiment of the present invention.
Figure 9:
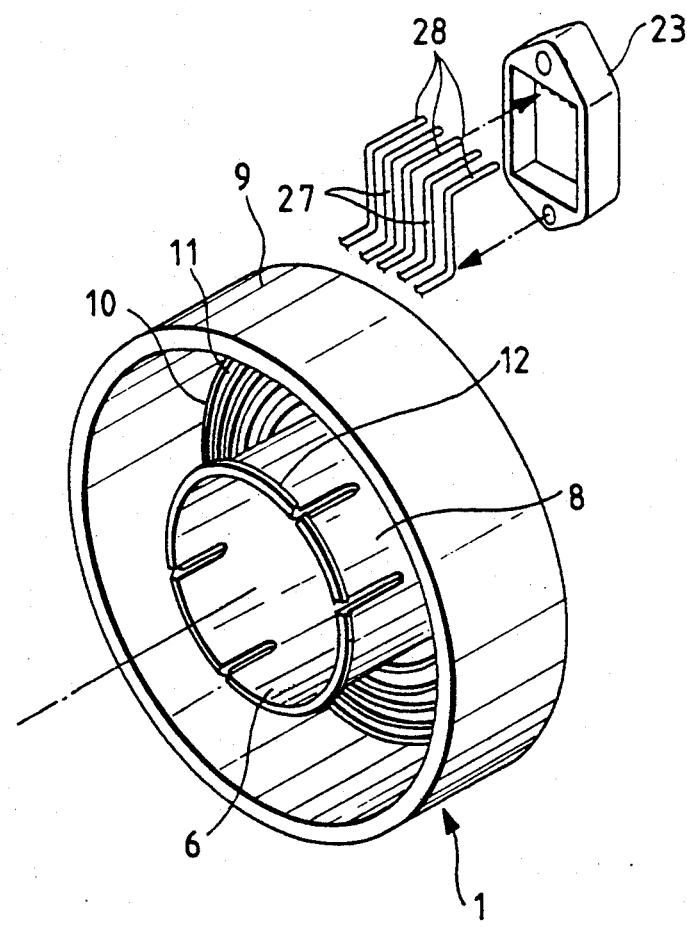
Figure 10:
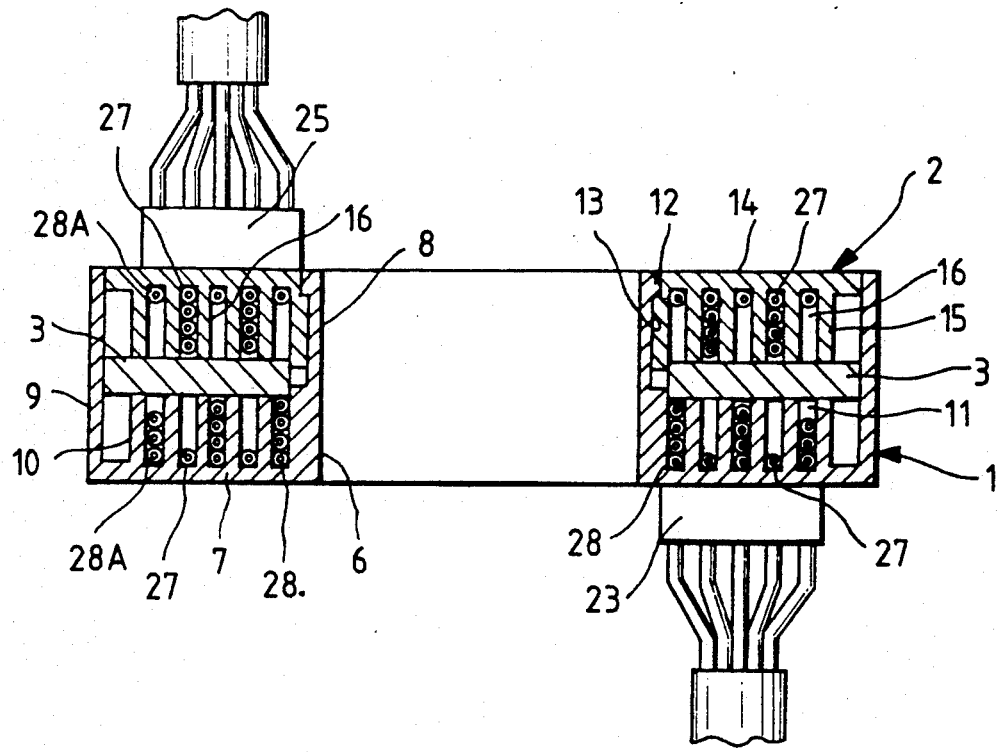
FIG. 10 is a vertical sectional view of the clock spring shown in FIGS. 8 and 9.

The operation of the clock spring according to the first preferred embodiment will next be described primarily with reference to FIGS. 7A to 7C in the case where the lower case 1 is used as a fixed member and the upper case 2 is used as a movable member. FIGS. 7A to 7C schematically show one of the flexible cables 5 (including the flexible cable 5A) and omit the lower case 1, the upper case 2, the spacer 3, etc. for ease of understanding.

FIG. 7A shows a condition where most of each flexible cable 5 is wrapped in the corresponding second cable accommodating groove 16 of the upper case 2. In this condition, a rotational position of the upper case 2 is a terminal position in a counterclockwise direction as shown by arrow C.

When the upper case 2 is rotated a predetermined amount from the condition shown in FIG. 7A in a clockwise direction (i.e., in a direction of arrow A shown in FIG. 7A), the gear 4 meshing with both the rack 12 of the lower case 1 and the rack 18 of the upper case 2 is rotated in a counterclockwise direction (i.e., in a direction of arrow B shown in FIG. 7A) about an axis of the roller 21, and simultaneously is revolved in the direction of arrow A about an axis of the upper case 2 by half of the rotational amount of the upper case 2. Accordingly, the spacer 3 supporting the gear 4 is also rotated in the direction of arrow A by the same amount as the revolutionary amount of the gear 4 (i.e., by half of the rotational amount of the upper case 2). Further, the inverted portion 5a of each flexible cable 5 almost semicircularly inverted about the second roller 22 is also moved in the direction of arrow A by the same amount as the rotational amount of the spacer 3 (i.e., by half of the rotational amount of the upper case 2). As a result, the flexible cable 5 accommodated in each second cable accommodating groove 16 of the upper case 2 is taken out by a length equal to the moving amount of the inverted portion 5a, and is received into each first cable accommodating groove 11 of the lower case 1 (see FIG. 7B).

In this manner, when the upper case 2 is rotated by an amount of N revolutions, the spacer 3 and the gear 4 with the second roller 22 are revolved about the axis of the upper case 2 by an amount of N/2 revolutions, and each flexible cable 5 in the second cable accommodating groove 16 is taken out by a length equal to the amount of N/2 revolutions and is received through the cutout 19 of the spacer 3 into the corresponding first cable accommodating groove 11 of the lower case 1 (see FIG. 7C). Until the flexible cable 5 accommodated in the second cable accommodating groove 16 of the upper case 2 is entirely taken out and received into the first cable accommodating groove 11 of the lower case 1; that is, until the number of revolutions of the upper case 2 becomes twice the number of wrappings of the flexible cable 5 in the upper case 2, the upper case 2 is allowed to be rotated in the clockwise direction, i.e., in the direction of arrow A. Finally, when the number of revolutions of the upper case 2 becomes twice the number of wrappings of the flexible cable 5 in the upper case 2, the rotation of the upper case 2 in the clockwise direction is terminated.

Converse to the above case, from the condition that most of each flexible cable 5 is wrapped in the corresponding first cable accommodating groove 11 of the lower case 1, when the upper case 2 is rotated a predetermined amount in a counterclockwise direction (i.e., in a direction of arrow C shown in FIG. 7A), the gear 4 is rotated in a clockwise direction (i.e. in a direction opposite to the direction of arrow B) about the axis of the roller 21, and simultaneously is revolved in the direction of arrow C about the axis of the upper case 2 by half of the rotational amount of the upper case 2. Accordingly, the flexible cable 5 accommodated in each first cable accommodating groove 11 of the lower case 1 is taken out through the cutout 19 of the spacer 3 by a length equal to the revolutionary amount of the gear 4 (i.e., by half of the rotational amount of the upper case 2), and is received into the corresponding second cable accommodating groove 16 of the upper case 2.

The above operation has been described on the assumption that the clock spring is mounted in the steering device under a proper condition or neutral condition of the upper case 1 such that each flexible cable 5 can be rotated in clockwise and counterclockwise directions by the same rotational amount. In this case, tension is not applied to the flexible cable 5A having the smallest number of wrapping and is also not applied the remaining flexible cables 5 at both the clockwise and counterclockwise terminal positions of the upper case 2. Accordingly, there is no possibility of all the flexible cables 5 being cut in a rotatable range of the steering wheel.

On the other hand, there is a possibility that the clock spring is erroneously mounted in the steering device under the condition that the upper case 2 is offset in the clockwise or counterclockwise direction from the neutral position. For instance, it is assumed that the erroneous mounting of the clock spring is carried out under the condition where the number of wrappings of each flexible cable 5 accommodated in the second cable accommodating grooves 16 of the upper case 2 is smaller than in the first cable accommodating grooves 11 of the lower case 1. In this case, when the steering wheel (i.e., the upper case 2) is rotated in the clockwise direction shown by arrow A toward the clockwise terminal position, the flexible cable 5A is entirely taken into the corresponding first cable accommodating groove 11 before the steering wheel reaches the clockwise terminal position. Accordingly, when the steering wheel is further rotated in the clockwise direction from the above condition, a tension is applied to the flexible cable 5A by a torque of the steering wheel to finally cut the flexible cable 5A. Converse to the above case, it is assumed that the erroneous mounting of the clock spring is carried out under the condition where the number of wrappings of each flexible cable 5 accommodated in the second cable accommodating grooves 16 of the upper case 2 is larger than that in the first cable accommodating grooves 11 of the lower case 1. In this case, when the steering wheel is rotated in the counterclockwise direction shown by arrow C toward the counterclockwise terminal position, the flexible cable 5A is entirely taken into the second cable accommodating grooves 16 before the steering wheel reaches the counterclockwise terminal position. Accordingly, when the steering wheel is further rotated in the counterclockwise direction from the above condition, a tension is applied to the flexible cable 5A by a torque of the steering wheel to finally cut the flexible cable 5A. Such a cutting operation can be easily effected because a round cable employed as each flexible cable is cut more easily than a flat cable, and the flexible cable 5A only is to be cut. For instance, a cutter for cutting the flexible cable 5A is provided by utilizing peripheral edges of the cable leading hole of the lower case 1 and the cable leading hole 17 of the upper case 2. Thereafter, when the flexible cable 5A is cut, this is electrically detected and a detection signal indicating cutting is fed to an alarm means such as an indicator or a buzzer. As a result, an operator can recognize the erroneous mounting of the clock spring visually or acoustically.

A second preferred embodiment of the present invention will now be described with reference to FIGS. 8 to 12, in which the same reference numerals as those in FIGS. 1 to 7 designate the corresponding parts.

The second preferred embodiment is basically identical in construction with the first preferred embodiment with the exception that first flexible cables 27 and second flexible cables 28 have different wrapping directions in each of the first and second cable accommodating grooves 11 and 16. In addition, the spacer 3 is rotatably driven by the first and second flexible cables 27 and 28. More specifically, the first flexible cables 27 (two cables) are wrapped in the counterclockwise direction in the first cable accommodating grooves 11 (two even grooves), and are inverted almost semi-circularly about one side of a substantially sectoral opening 19 formed through the annular spacer 3, thereafter being wrapped in the clockwise direction in the corresponding second cable accommodating grooves 11. On the other hand, the second flexible cables 28 (the remaining three cables) are wrapped in the clockwise direction in the first cable accommodating grooves 11 (three odd grooves), and are inverted almost semi-circularly about the other side of the sectoral opening 19 of the spacer 3, thereafter being wrapped in the counterclockwise direction in the corresponding second cable accommodating grooves 16. In this preferred embodiment, the number of wrappings of the second flexible cable 28 wrapped in the outermost grooves 11 and 16 (which flexible cable is denoted by reference numeral 28A for the convenience of explanation) is set to be smaller than the number of wrapping of each of the remaining four flexible cables 27 and 28.

The operation of the second preferred embodiment will be described primarily with reference to FIGS. 11 and 12, in which one of the first flexible cables 27 and one of the second flexible cables 28 are schematically shown for ease of understanding.

Figure 11:
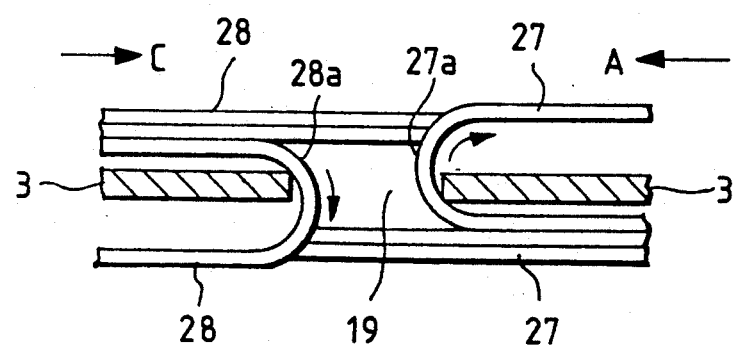
FIGS. 11 and 12 are schematic illustrations of the operation of the second preferred embodiment.
Figure 12:
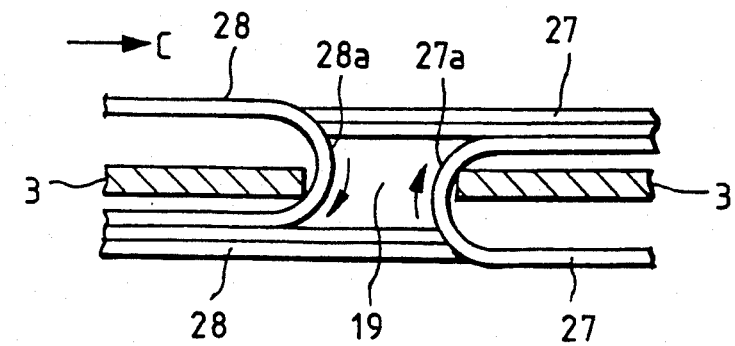

FIG. 11 shows a condition where most of each first flexible cable 27 is wrapped in the corresponding first cable accommodating groove 11 of the lower case 1, and most of each second flexible cable 28 is wrapped in the corresponding second cable accommodating groove 16.

When the upper case 2 is rotated a predetermined amount in the counterclockwise direction (i.e., in the direction of arrow C in FIG. 11) from the condition shown in FIG. 11, inverted portions 27a and 28a of the first and second flexible cables 27 and 28 are moved by half of the rotational amount of the upper case 2 in the direction of arrow C. As a result, the first flexible cables 27 are taken out of the corresponding first cable accommodating grooves 11 of the lower case 1 by a length equal to the moving amount of the inverted portion 27a, and are received into the corresponding second cable accommodating grooves 16 of the upper case 2. Simultaneously, the second flexible cables 28 are taken out of the corresponding second cable accommodating grooves 16 of the upper case 2 by the same length as above, and are received into the corresponding first cable accommodating grooves 11 of the lower case 1. At this time, since the inverted portions 27a of the first flexible cables 27 urge one side of the sectoral opening 19 of the spacer 3 to thereby rotationally drive the spacer 3 in the direction of arrow C by half of the rotational amount of the upper case 2, the sectoral opening 19 follows the inverted portions 27a and 28a of the first and second flexible cables 27 and 28 to be rotationally moved.

In this manner, when the upper case 2 is rotated in the direction of arrow C by an amount of N revolutions, the inverted portions 27a and 28a and the spacer 3 are rotated in the direction of arrow C by an amount of N/2 revolutions. As a result, each second flexible cable 28 is taken out of the corresponding second cable accommodating groove 16 through the opening 19 into the corresponding first cable accommodating groove 11 by a length equal to the amount of N/2 revolutions. Simultaneously, each first flexible cable 27 is taken out of the corresponding first cable accommodating groove 11 through the opening 19 into the corresponding second cable accommodating groove 16 by a length equal to the amount of N/2 revolutions.

Converse to the above case, from the condition that most of each first flexible cable 27 is wrapped in the corresponding second cable accommodating groove 16 of the upper case 2, and most of each second flexible cable 28 is wrapped in the corresponding first cable accommodating groove 11 of the lower case 1, when the upper case 2 is rotated in the clockwise direction (i.e., in the direction of arrow A) the inverted portion 28a of each second flexible cable 28 urges the other side of the sectoral opening 19 of the spacer 3 to thereby rotationally drive the spacer 3 in the direction of arrow A. Accordingly, the inverted portions 27a and 28a of the first and second flexible cables 27 and 28 and the spacer 3 are rotated in the direction of arrow A by half of a rotational amount of the upper case 2. As a result, each second flexible cable 28 is taken out of the corresponding first cable accommodating groove 11 of the lower case 1 through the opening 19 into the corresponding second cable accommodating groove 16 of the upper case 2 by a length equal to the moving amount of the spacer 3. Simultaneously, each first flexible cable 27 is taken out of the corresponding second cable accommodating groove 16 through the opening 19 into the corresponding first cable accommodating groove 11.

Also according to the second preferred embodiment, in the case that the clock spring is properly mounted in the steering device, there is no possibility of the first and second flexible cables 27 and 28 being cut in the rotatable range of the steering wheel. On the other hand, in the case that the clock spring is erroneously mounted in the steering device, a tension is applied to the second flexible cable 28A only which has the smallest number of wrappings before the steering wheel reaches its clockwise or counterclockwise terminal position, and the second flexible cable 28A is cut by the lower case 1 or the upper case 2, thus detecting the erroneous mounting of the clock spring.

According to the above preferred embodiments, a necessary length of each flexible cable can be reduced to about the half of a rotational amount of the movable member to be required. Accordingly, the length of each flexible cable can be reduced more than that of the prior art flexible cable. Furthermore, since an inexpensive round cable is used as the flexible cable, a total cost of the clock spring can be greatly reduced. Moreover, since each flexible cable is short, a cable accommodating chamber defined between the fixed member and the movable member can be reduced in diameter to thereby advantageously realize a compact size of the clock spring.

Further, the opposed surfaces of the lower case 1 and the upper case 2 are formed with the first cable accommodating grooves 11 and the second cable accommodating grooves 16 arranged separately and concentrically with the same groove pitch, and the planar spacer 3 is interposed between the first cable accommodating grooves 11 and the second cable accommodating grooves 16. Accordingly, not only are the plural flexible cables in the first and second cable accommodating grooves 11 and 16 prevented from being entangled with each other, but also one portion of each flexible cable in the first cable accommodating groove 11 can be prevented from being entangled with the other portion of the same flexible cable in the corresponding second cable accommodating groove 16. Thus, wrapping and unwrapping of the flexible cables can be smoothly effected.

Furthermore, in the case that the clock spring is erroneously mounted under the condition where the flexible cables are offset from the neutral position to either the first or second cable accommodating grooves, a tension is applied to one of the flexible cables which has the smallest number of wrappings at the rotational terminal position, and this flexible cable only is easily cut by the upper case or the lower case, thus reliably detecting the erroneous mounting of the clock spring.

Figure 13:
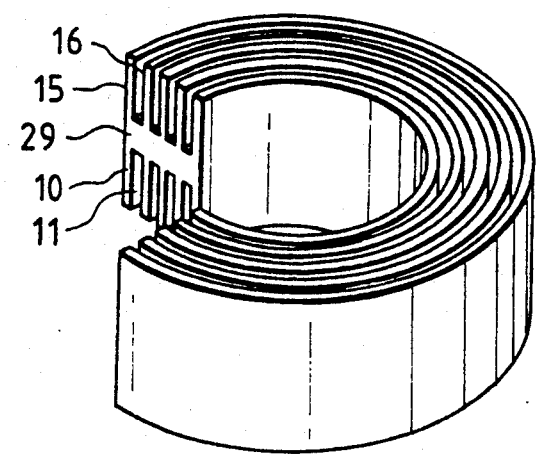
FIG. 13 is a perspective view of a modification of a spacer.

In the preferred embodiments, the first and second cable accommodating grooves 11 and 16 are defined by integrally forming the partition walls 10 and 15 with the bottom wall 7 of the lower case 1 and the top wall 14 of the upper case 2, respectively. However, as a modification, as shown in FIG. 13, the first and second cable accommodating grooves 11 and 16 may be defined by integrally forming the partition walls 10 and 15 with a spacer 29 so as to make them project from upper and lower surfaces of the spacer 29. Alternatively, either of the first or second cable accommodating grooves 11 or 16 may be defined on the spacer 29 side.

Further, although the number of the flexible cables 5 (27, 28) is set five, and the first and second cable accommodating grooves 11 and 16 are provided in the same number as that of the flexible cables 5 (27, 28) in the above preferred embodiments, it is needless to say that the number of the flexible cables and the first and second cable accommodating grooves is not limited to the above. Additionally, while one of the flexible cables has the smaller number of wrappings than the remaining flexible cables in the above preferred embodiments, several of the flexible cables may have the smaller number of wrapping than the remaining flexible cables, and they may be cut in the case of erroneous mounting.

Further, it is needless to say that the number of wrappings of one or several of the flexible cables may be reduced integer times such as once or twice, or decimal times such as 0.3 times, 0.5 times or 1.7 times.

Next, a third preferred embodiment of the present invention will be described with reference to FIGS. 14 to 16.

Figure 14:
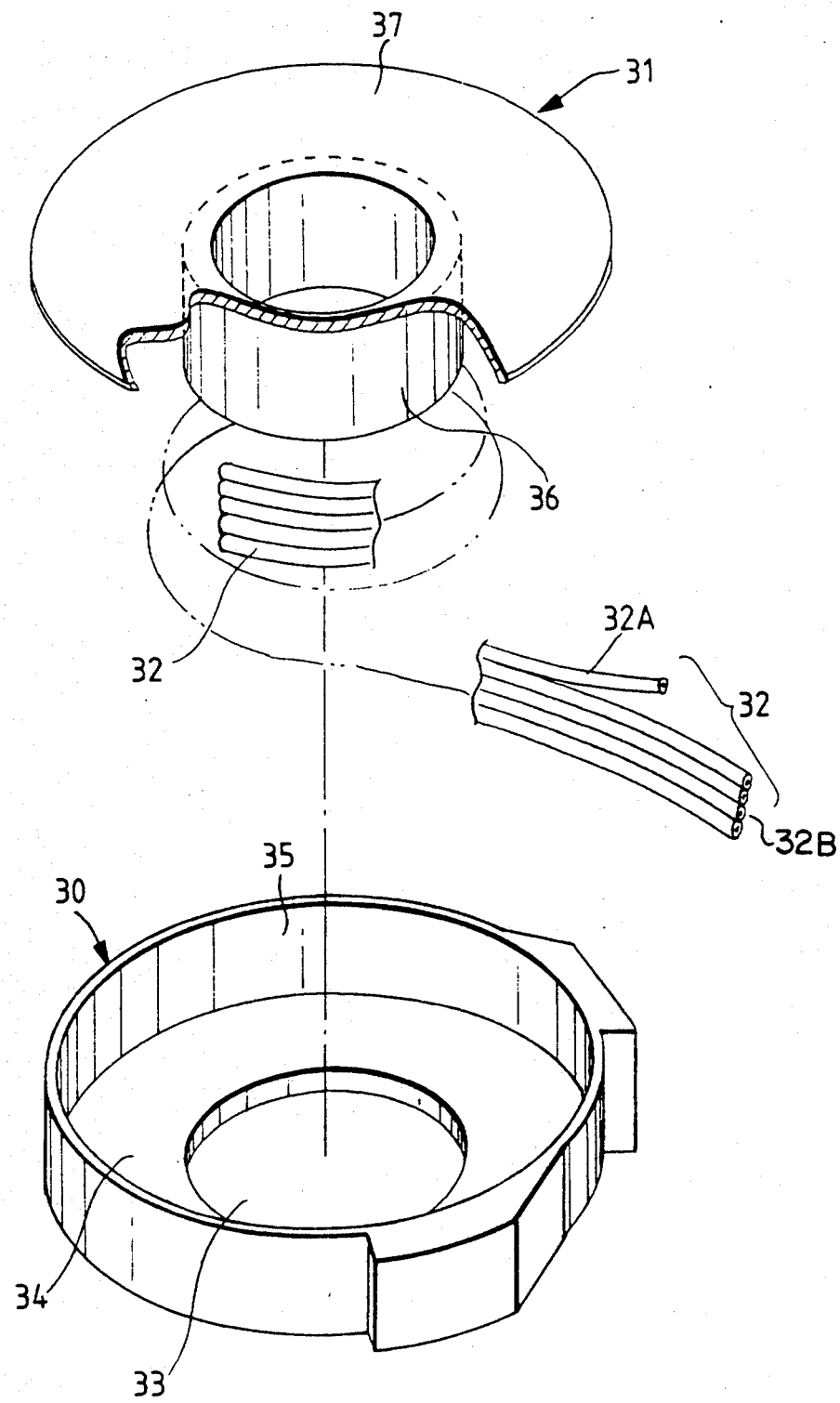
FIG. 14 is a partially cut-away, exploded perspective view of the clock spring according to a third preferred embodiment of the present invention.
Figure 15:
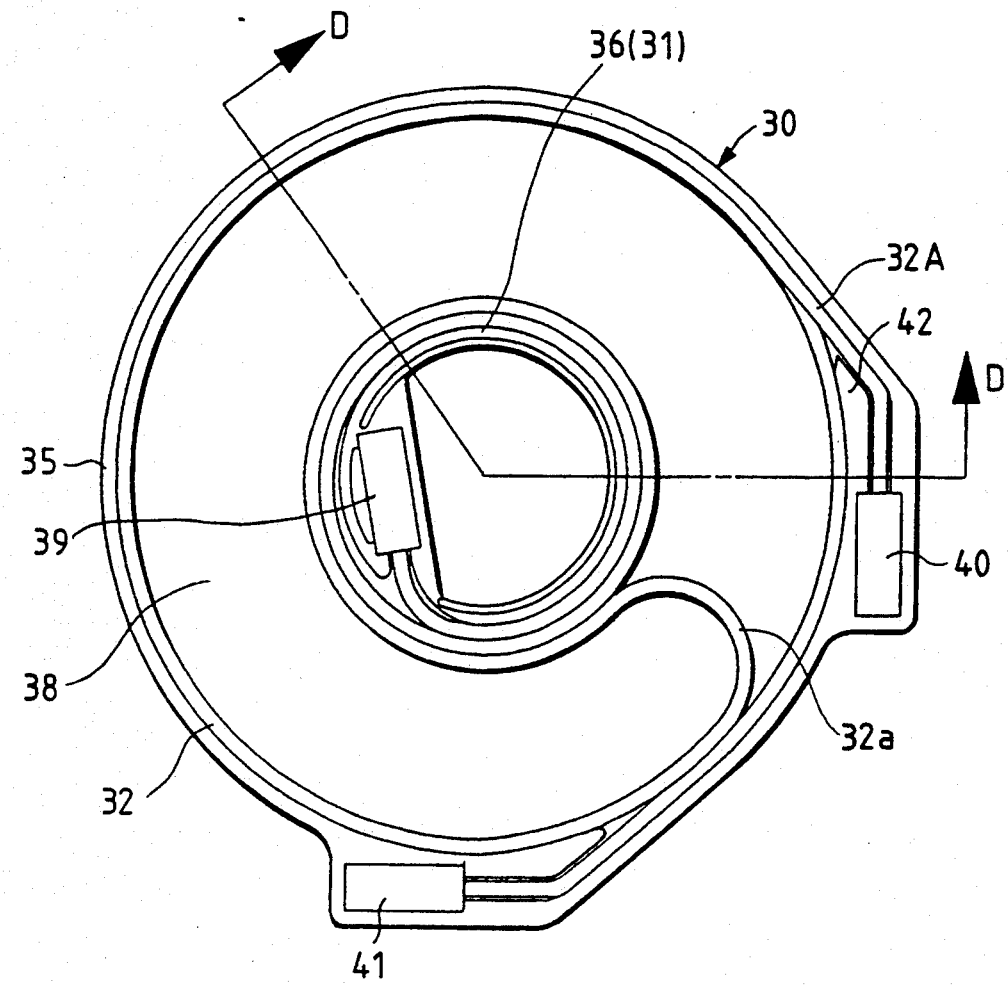
FIG. 15 is a partially omitted, top plan view of an upper case shown in FIG. 14.
Figure 16:
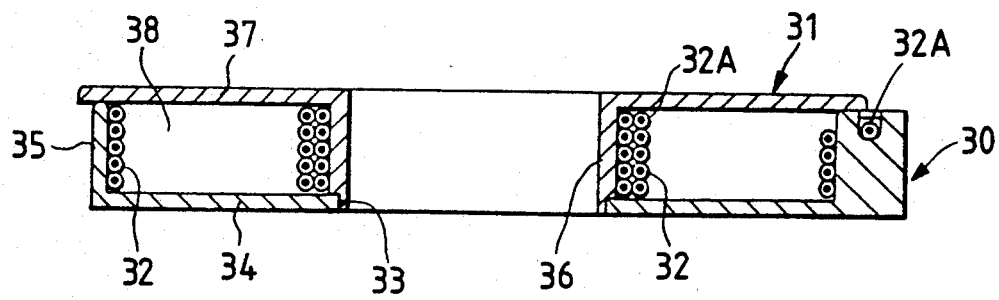
FIG. 16 is a vertical sectional view taken along the line D—D in FIG. 15.

Referring to FIGS. 14 to 16, a clock spring according to the third preferred embodiment is generally constructed of a lower case 30, an upper case 31 rotatably retained with respect to the lower case 30, and a single strip-shaped flexible cable 32 accommodated in a wrapped condition between the lower case 30 and the upper case 31.

The lower case 30 is comprised of an annular bottom wall 34 having a central opening 33, and a cylindrical outer side wall 35 rising from an outer circumference of the bottom wall 34. Thus, the lower case 30 has a generally annular, cylindrical shape with a bottom. On the other hand, the upper case 31 is comprised of an annular top wall 37 having a central opening 37a, and a cylindrical inner side wall 36 dependent upon an inner circumference of the top wall 37. The upper case 31 is rotatably connected to the lower case 30 in such a manner that a lower end of the inner side wall 36 is guided by an inner circumference of the bottom wall 34 and that an outer circumference of the top wall 37 is guided by an upper end of the outer side wall 35. As best seen in FIG. 16, an annular, cylindrical cable accommodating space 38 is defined by the bottom wall 34 and the outer side wall 35 of the lower case 30 and the top wall 37 and the inner side wall 36 of the upper case 31.

The flexible cable 32 is constructed in the shape of a strip by integrally connecting five round cables. In this preferred embodiment, for the convenience of explanation, the uppermost one of the five round cables constituting the flexible cable 32 will be hereinafter referred to as a flexible cable element 32A, while the remaining round cables constituting the flexible cable 32 will be hereinafter referred to as flexible cable elements 32B. It is to be noted that the flexible cable element 32A is somewhat shorter than the flexible cable elements 32B. As shown in FIG. 15, one end of each of the flexible cable elements 32A and 32B is connected to a first connector 39 embedded in the inner side wall 36 of the upper case 31, and is led out of the upper case 31 through the first connector 39. On the other hand, a second connector 40 and a third connector 41 are embedded in the outer side wall 35 of the lower case 31 at circumferentially spaced positions. The other end of the flexible cable element 32A is connected to the second connector 40, and the other end of each of the flexible cable elements 32B is connected to the third connector 41. These other ends are led out of the lower case 30 through the second connector 40 and the third connector 41. The flexible cable elements 32A and 32B accommodated in the space 38 extend from the second and third connectors 40 and 41, respectively, and are wrapped together on the inner surface of the outer side wall 35 in a counterclockwise direction as viewed in FIG. 15. At the end of the counterclockwise wrapping, the flexible cable 32 is U-shapedly inverted to form an inverted portion 32a. The flexible cable 32 further extends inwardly from the inverted portion 32a so as to be wrapped about an outer surface of the inner side wall 36 in a clockwise direction as viewed in FIG. 15 until reaching the first connector 39.

The operation of the clock spring according to the third preferred embodiment will next be described in the case where the lower case 30 is used as a fixed member and the upper case 31 is used as a movable member.

FIG. 15 shows a neutral condition such that the flexible cable 32 is wrapped both on the inner surface of the outer side wall 35 of the lower case 30 and about the outer surface of the inner side wall 36 of the upper case 31. When the upper case 31 is rotated from the neutral condition in the clockwise direction, the inverted portion 32a of the flexible cable 32 is moved in the clockwise direction by an amount smaller than a rotational amount of the upper case 31. Accordingly, the flexible cable 32 wrapped on the inner surface of the outer side wall 35 is unwrapped by a length equal to the moving amount of the inverted portion 32a, and is simultaneously wrapped about the inner side wall 36. Thereafter, until the flexible cable 32 wrapped on the inner surface of the outer side wall 35 is entirely unwrapped to be wrapped about the inner side wall 36, the upper case 31 is allowed to be rotated in the clockwise direction. Finally, when the flexible cable 32 is entirely wrapped about the inner side wall 36 as mentioned above, the clockwise rotation of the upper case 31 is terminated.

Converse to the above case, when the upper case 31 is rotated from the neutral condition shown in FIG. 15 in the counterclockwise direction, the inverted portion 32a of the flexible cable 32 is moved in the counterclockwise direction by an amount smaller than a rotational amount of the upper case 31. Accordingly, the flexible cable 32 wrapped about the inner side wall 36 is unwrapped by a length equal to the moving amount of the inverted portion 32a, and is simultaneously wrapped on the inner surface of the outer side wall 35. Thereafter, until the flexible cable 32 wrapped about the inner side wall 36 is entirely unwrapped to be wrapped on the inner surface of the outer side wall 35, the upper case 31 is allowed to be rotated in the counterclockwise direction. Finally, when the flexible cable 32 is entirely wrapped on the inner surface of the outer side wall 35 as mentioned above, the counterclockwise rotation of the upper case 31 is terminated.

The above operation has been described on the assumption that the clock spring is mounted in the steering device under a proper condition or neutral condition of the upper case 31 such that the flexible cable 32 can be rotated in clockwise and counterclockwise directions by the same rotational amount. In this case, tension is not applied to the shorter flexible cable element 32A connected to the second connector 40 and also not applied to the remaining flexible cable elements 32B connected to the third connector 41 at both the clockwise and counterclockwise terminal positions of the upper case 31. Accordingly, there is no possibility of all the flexible cable elements 32A and 32B being cut in a rotatable range of the steering wheel.

Figure 17:
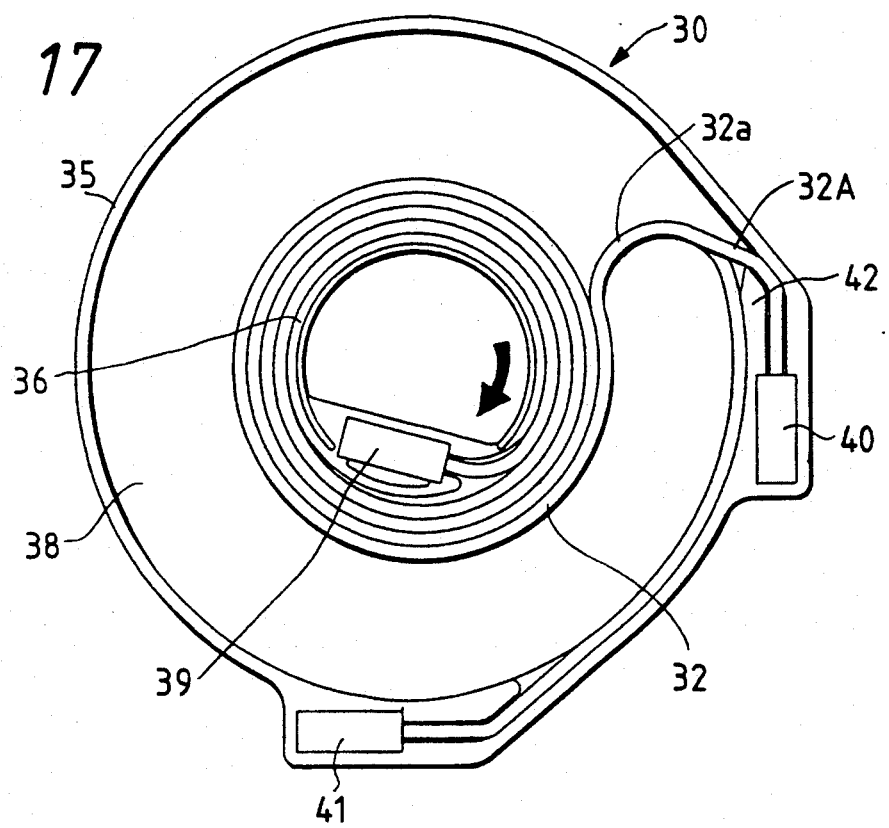
FIGS. 17 and 18 are views similar to FIG. 15, illustrating the operation of the third preferred embodiment in the case that the clock spring is erroneously mounted.
Figure 18:
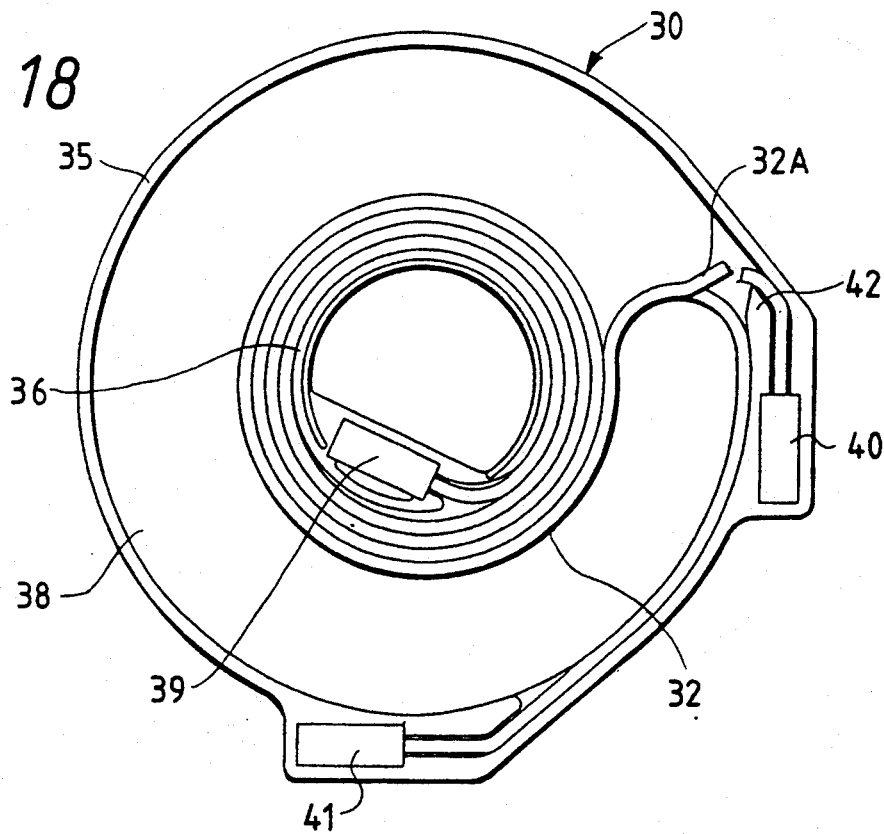

FIGS. 17 and 18 show the operation in the case that the clock spring is erroneously mounted in the steering device under the condition where the upper case 31 is offset in the clockwise direction from the neutral position. In this case, when the upper case 31 is rotated in the clockwise direction, the inverted portion 32a of the flexible cable 32 is moved in the clockwise direction by an amount smaller than a rotational amount of the upper case 31, and the flexible cable 32 is unwrapped from the inner surface of the outer side wall 35 by a length equal to a moving amount of the inverted portion 32a, and is wrapped about the outer surface of the inner side wall 36. However, before the upper case 31 reaches its clockwise terminal position, a tension is applied to an outer end portion of the shorter flexible cable 32A connected to the second connector 40 as shown in FIG. 17. Accordingly, when the upper case 31 is further rotated from this condition, the flexible cable 32A is easily cut by a cutter 42 provided in the vicinity of the second connector 40.

According to the third preferred embodiment, the direction of wrapping of the flexible cable 32 on the inner surface of the outer side wall 35 and the direction of wrapping of the flexible cable 32 about the inner side wall 36 are reverse to each other through the inverted portion 32a. Accordingly, a necessary length of the flexible cable 32 can be greatly reduced, resulting in a reduction in total cost and a reduction in size.

Figure 19:
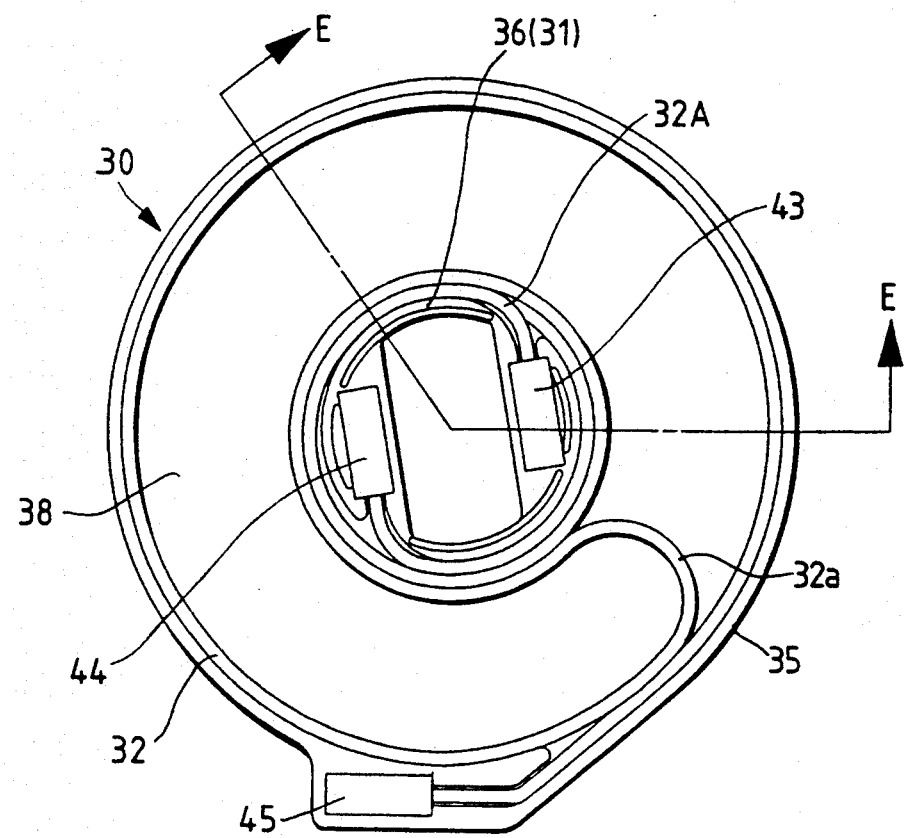
FIG. 19 is a view similar to FIG. 15, showing a fourth preferred embodiment of the present invention.
Figure 20:
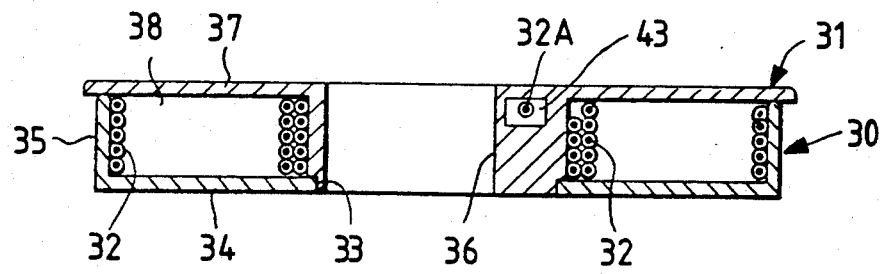
FIG. 20 is a vertical sectional view taken along the line E—E in FIG. 19.

FIGS. 19 and 20 show a fourth preferred embodiment of the present invention, in which the same reference numerals as those in FIGS. 14 to 16 designate the corresponding parts.

The fourth preferred embodiment is basically identical in construction with the third preferred embodiment except for the following points. That is, a first connector 43 and a second connector 44 are embedded in the inner side wall 36 at circumferentially spaced positions, and one end of the shorter flexible cable element 32A is connected to the first connector 43, while one end of each of the remaining flexible cable elements 32B is connected to the second connector 44. On the other hand, a third connector 45 is embedded in the outer side wall 35, and the other ends of each of all the flexible cable elements 32A and 32B are connected to the third connector 45. According to the fourth preferred embodiment, it is assumed that the clock spring is erroneously mounted in the steering device under the condition where the upper case 31 is offset in the counterclockwise direction from the neutral position. In this case, when the upper case 31 is rotated in the counterclockwise direction toward the counterclockwise terminal position, but, before the upper case 31 reaches the counterclockwise terminal position, a tension is applied to an inner end portion of the shorter flexible cable 32A connected to the first connector 43. Accordingly, when the upper case 31 is further rotated from this condition, the flexible cable element 32A is cut by a torque of the upper case 31.

In the third and fourth preferred embodiments, the flexible cable element 32A is made shorter than the remaining flexible cable elements 32B, and the cable leading portion provided in either the outer side wall 35 or the inner side wall 36 for leading the shorter flexible cable element 32A out of the lower case 30 or the upper case 31 is circumferentially offset from the cable leading portion provided in the outer side wall 35 or the inner side wall 36 for leading the remaining flexible cable elements 32B out of the lower case 30 or the upper case 31, so as to cut the shorter flexible cable element 32A in the case of erroneous mounting. In modification, the third and fourth preferred embodiments may be combined. That is, the cable leading portions provided in both the outer side wall 35 and the inner side wall 36 for leading the shorter flexible cable element 32A out of the lower case 30 and the upper case 31 may be circumferentially offset from the cable leading portions for leading the remaining flexible cable elements 32B out of the lower case 30 and the upper case 31. In this case, in whichever direction of the clockwise or counterclockwise direction the upper cable 31 is offset from the neutral position upon erroneous mounting of the clock spring, the shorter flexible cable element 32A can be reliably cut.

Further, also in the third and fourth preferred embodiments, it is needless to say that the number of all the flexible cable elements 32A and 32B constituting the flexible cable 32 is not limited to five. In addition, the number of the shorter flexible cable element 32A is not limited to one. For instance, several shorter flexible cable elements may be used. In this case, a cable leading portion for leading out the several shorter flexible cable elements is circumferentially deflected from a cable leading portion for leading out the remaining flexible cable elements, so as to cut the several flexible cable elements.

In addition, although the lower case 1 (30) is used as the fixed member, and the upper case 2 (31) is used as the movable member in the first to sixth preferred embodiments, the upper case may be used as the fixed member, and the lower case may be used as the movable member.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a clock spring including a fixed member, a movable member rotatably mounted on said fixed member with a cable accommodating portion defined therebetween, and a cable accommodated in said cable accommodating portion, said cable having one end fixed to said fixed member and led out of said fixed member and having the other end fixed to said movable member and led out of said movable member; the improvement wherein said cable accommodating portion comprises a plurality of first concentric grooves and second concentric grooves arranged in opposed relationship to each other, and said cable comprises a plurality of wire-like cables separated from one another, one portion of said wire-like cables being wrapped in one direction within either of said first concentric grooves or said second concentric grooves, while the other portion being wrapped in the opposite direction reverse to said one direction within the other of said first concentric grooves and said second concentric grooves, whereby an inverted portion of each said wire-like cable is formed between said one portion and said other portion, the number of wrapping of one or several of said wire-like cables being smaller than that of the remaining wire-like cables.

2. In a clock spring including a fixed member, a movable member rotatably mounted on said fixed member with a cable accommodating portion defined therebetween, and a cable accommodated in said cable accommodating portion, said cable having one end fixed to said fixed member and led out of said fixed member and having the other end fixed to said movable member and led out of said movable member; the improvement wherein one of said fixed member and said movable member is provided with an inner cylindrical portion, and the other of said fixed member and said movable member is provided with an outer cylindrical portion, one portion of said cable being wrapped in one direction on an outer surface of said inner cylindrical portion, while the other portion being wrapped in the opposite direction reverse to said one direction on an inner surface of said outer cylindrical portion, whereby an inverted portion of said cable is formed between said one portion and said other portion, said cable comprising a plurality of cable elements extending in parallel to one another, at least one of said inner cylindrical portion and said outer cylindrical portion being provided with a plurality of cable leading portions for leading out one or several of said cable elements and leading out the remaining cable elements, said cable leading portions being positioned circumferentially apart from one another.

* * * * *